Jan. 1, 1935.  C. C. C. BURKHARDT  1,986,042
CAB FOR ELECTRIC LOCOMOTIVES
Filed Feb. 4, 1932
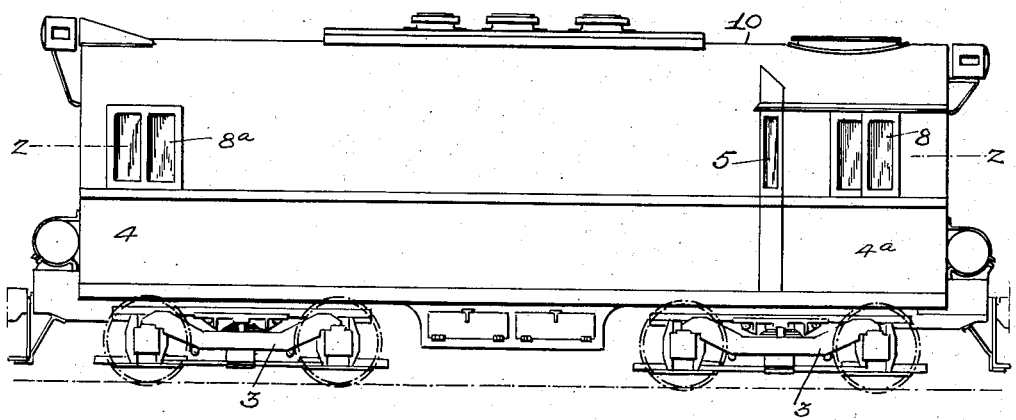
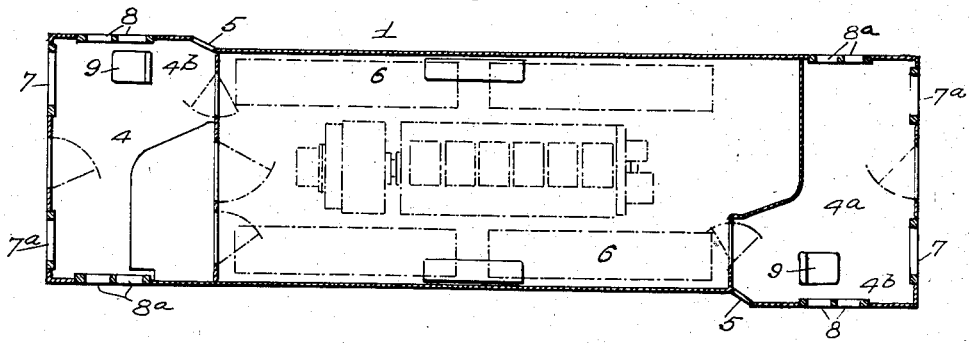

Patented Jan. 1, 1935

1,986,042

UNITED STATES PATENT OFFICE 1,986,042

CAB FOR ELECTRIC LOCOMOTIVES

Conrad C. C. Burkhardt, Philadelphia, Pa.

Application February 4, 1932, Serial No. 590,932

1 Claim. (Cl. 105—456)

My invention relates to certain improvements in cabs for electric locomotives of the type having an operator's compartment at each end of the cab and a space between the two compartments for the mechanism of the locomotive.

It has been the practice heretofore in designing the cabs of electric locomotives to extend the cab the full length of the frame and to make the sides the full width of the frame, the sides being on the same plane throughout.

Usually each operator's compartment has windows at the front for front vision and side windows are also provided, but in this type of cab no means was provided for allowing the operator to have a clear vision of the train at the rear of the locomotive, unless he leans out of a side window, which is very dangerous.

The object of my invention is to provide for rear observation for the operator when occupying a compartment at either end of the cab. This object I attain in the following manner, reference being had to the accompanying drawing in which:

Fig. 1 is a side view of an electric locomotive of the type having an operator's compartment at each end of the cab and illustrating my invention;

Fig. 2 is a sectional plan view on the line 2—2, Fig. 1.

Referring to the drawing, 1 is the cab of an electric locomotive which extends the full length of the base frame 2 and is substantially the same width as the base frame.

The base frame 2 is mounted on trucks 3—3 in the present instance.

At each end of the cab 1 is an operator's compartment 4 and 4a and in the space 6 between the two operators' compartments is located the mechanism of the locomotive.

The side walls of the cab extend to the roof 10 which is of an even height throughout.

In order to provide means whereby the operator in either compartment can observe the train at the rear, one side of each compartment is extended beyond the side walls of the cab as at 4b and in the rear wall of the extension 4b of each compartment is a window opening 5. The wall is preferably inclined as shown to provide for a wide window. The extension of one compartment is on the opposite side of the cab from the extension of the other compartment so that the operator on turning around can have a clear view along the side of the cab and the train at the rear of the locomotive. The side of each compartment opposite the extension is flush with the side wall of the cab so that the rear view from either end of the cab is unobstructed.

The operator's seat 9 is at the extension of the cab and directly in front of the seat is the front window opening 7 and in the side of the extension is a window 8. In the opposite side of the compartment in the present instance, is a window opening 8a and an additional window opening 7a is provided at the front.

I claim:

The combination in a cab for electric locomotives, of a base frame, an operator's compartment at each end of the cab, the cab having a space between the two operators' compartments for the mechanism of the locomotive; the cab extending substantially the full width of the base frame, each operator's compartment having a lateral extension beyond one side of the cab, the extension having a rear window opening, the extension of the operator's compartment at one end of the cab being on the opposite side of the cab from the extension of the operator's compartment at the opposite end of the cab, so that the operator when occupying either compartment can have a clear view past the cab of the train at the rear of the locomotive.

CONRAD C. C. BURKHARDT.